(12) United States Patent
Kim

(10) Patent No.: US 7,298,410 B2
(45) Date of Patent: Nov. 20, 2007

(54) AUTOMATICALLY EJECTABLE VIEWFINDER OF PHOTOGRAPHING APPARATUS AND PHOTOGRAPHING APPARATUS HAVING THE SAME

(75) Inventor: Jeong-goo Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 837 days.

(21) Appl. No.: 10/125,496

(22) Filed: Apr. 19, 2002

(65) Prior Publication Data
US 2002/0196358 A1    Dec. 26, 2002

(30) Foreign Application Priority Data
Jun. 22, 2001  (KR) ................ 2001-35650

(51) Int. Cl.
H04N 5/222    (2006.01)
H04N 5/225    (2006.01)
G03B 13/02    (2006.01)

(52) U.S. Cl. ............... 348/333.06; 348/341; 348/373; 396/374

(58) Field of Classification Search ........ 348/333.01, 348/333.06, 333.07, 333.08, 341, 373, 374, 348/375, 376; D16/218, 220; 396/373, 396/374, 379, 378
See application file for complete search history.

(56) References Cited

U.S. PATENT DOCUMENTS

| | | | | |
|---|---|---|---|---|
| 3,153,995 A * | 10/1964 | Bretthauer et al. | ......... | 396/373 |
| 4,443,086 A * | 4/1984 | Hosoe et al. | ................ | 396/147 |
| 4,624,541 A * | 11/1986 | Park | ............................ | 396/373 |
| 5,378,973 A * | 1/1995 | Kim | ...................... | 348/333.01 |
| 5,694,628 A * | 12/1997 | Nishitani | .................... | 396/379 |
| 5,701,535 A * | 12/1997 | Reibl | ........................ | 396/373 |
| 5,893,649 A * | 4/1999 | Shimada | ................ | 348/333.06 |
| 5,960,156 A * | 9/1999 | Nishiyama et al. | ......... | 348/374 |
| 5,982,429 A * | 11/1999 | Kamamoto et al. | .... | 348/333.06 |
| 6,356,716 B1 * | 3/2002 | Itabashi et al. | ............. | 396/299 |
| 6,549,237 B1 * | 4/2003 | Inuma et al. | .......... | 348/333.06 |

(Continued)

FOREIGN PATENT DOCUMENTS

DE    2362403 A *    6/1975

(Continued)

Primary Examiner—John M. Villecco
(74) Attorney, Agent, or Firm—Staas & Halsey LLP

(57) ABSTRACT

A viewfinder of a photographing apparatus to monitor a photographed image. The viewfinder of the photographing apparatus has a viewfinder body disposed to be drawn inside of the photographing apparatus body and outside of the photographing apparatus body, and a driving unit to drive the drawing-in and drawing-out of the viewfinder body. Moreover, when an outer LCD, which is disposed at an outer part of the photographing apparatus body, is rotated by a predetermined degree in a state that the viewfinder body is drawn outside of the photographing apparatus body, the viewfinder body is automatically drawn inside of the photographing apparatus body. On the other hand, when the outer LCD is rotated on a rotating axis on a plane of the outer LCD and faces an object, the viewfinder body is drawn out again to the outside of the photographing apparatus body. Therefore, the viewfinder of the photographing apparatus can be drawn in and drawn out of the photographing apparatus body in accordance with driving of the driving unit. Accordingly, the appearance of the camcorder becomes more appealing to the eye, and storing and handling of the product becomes easier.

25 Claims, 7 Drawing Sheets

U.S. PATENT DOCUMENTS

| | | | |
|---|---|---|---|
| 6,597,400 B2 * | 7/2003 | Nishimura | 348/333.02 |
| 6,819,868 B2 * | 11/2004 | Kume et al. | 348/333.06 |
| 7,242,431 B2 * | 7/2007 | Kim | 348/333.06 |
| 2001/0005454 A1 * | 6/2001 | Nishino et al. | 396/287 |
| 2002/0171748 A1 * | 11/2002 | Kim | 348/333.01 |
| 2005/0190278 A1 * | 9/2005 | Oh | 348/333.01 |

FOREIGN PATENT DOCUMENTS

| | | | |
|---|---|---|---|
| JP | 06102562 A | * | 4/1994 |
| JP | 07099598 A | * | 4/1995 |
| JP | 2000307903 A | * | 11/2000 |
| JP | 2001028700 A | * | 1/2001 |
| JP | 2001275019 A | * | 10/2001 |
| JP | 2004266613 A | * | 9/2004 |
| JP | 2005062563 A | * | 3/2005 |

* cited by examiner

FIG.7

| OUTER LCD | | VIEWFINDER |
|---|---|---|
| OPEN | PIVOT | DRAWING IN |
| | ROTATING | DRAWING OUT |
| CLOSE | | DRAWING OUT |

FIG.8

| SW1 | SW2 | OUTER LCD | VIEWFINDER |
|---|---|---|---|
| OFF | OFF | X | X |
| OFF | ON | X | O |
| ON | OFF | O | X |
| ON | ON | O | O |

AUTOMATICALLY EJECTABLE VIEWFINDER OF PHOTOGRAPHING APPARATUS AND PHOTOGRAPHING APPARATUS HAVING THE SAME

CROSS-REFERENCE TO RELATED APPLICATIONS

This application claims the benefit of Korean Patent Application No. 01-35650 filed on Jun. 22, 2001, in the Korean Industrial Property Office, the disclosure of which is incorporated herein by reference.

BACKGROUND OF THE INVENTION

1. Field of the Invention

The present invention relates to a viewfinder of a photographing apparatus, and more particularly to a viewfinder of a photographing apparatus that allows a user to monitor a photographing image (or object) or a reproducing image when photographing an image or reproducing the photographed image using a photographing apparatus.

2. Description of the Related Art

A photographing apparatus is a device to photograph an image (or object, etc.). As an example of the photographing apparatus, there is an apparatus that can only photograph an image, such as a manual or an automatic camera, and an apparatus that can photograph and reproduce the image, such as a camcorder or a digital camera.

A camcorder, (also referred to as a video camera, ) photographs an image and records it as image data on a videotape, and it is used generally to record and/or reproduce the image among many photographing apparatuses. Generally, the camcorder includes a viewfinder to monitor a photographing image or a reproducing image when a user photographs an image or reproduces the photographed image.

FIG. 1 is a perspective view schematically illustrating the viewfinder of a conventional camcorder.

As shown in FIG. 1, a conventional camcorder 10 includes a camcorder body 11 having a photographing unit to photograph the image and a recording unit to record the photographed image, and a view finder 12 formed on an outer part of the camcorder body 11 to allow the user to monitor the photographing or the reproducing image. The viewfinder 12 can be manually rotated 70° to 90° to an upper part of the camcorder body 11 as indicated by the arrow A in FIG. 1, and the viewfinder 12 protrudes from the camcorder body 11.

However, since the viewfinder of a conventional camcorder with the above construction is mounted on the camcorder body in a protruding fashion, there is a problem in that handling and storing of the product is inconvenient. In addition, when the camcorder is designed, it is difficult to design the appearance of the camcorder as simple and appealing to the eye because the construction of the viewfinder must be considered. Moreover, operation of the camcorder is not simple since the user has to move the viewfinder manually.

SUMMARY OF THE INVENTION

The present invention has been designed to overcome the above-mentioned and other problems of the related art.

Accordingly, it is an object of the present invention to provide a viewfinder of a photographing apparatus that is easy to handle and store, and a camcorder having the same.

It is another object of the present invention to provide a viewfinder of a photographing apparatus of simple and appealing design, and a camcorder having the same.

It is yet another object of the present invention to provide a viewfinder of a photographing apparatus that has a simple operation of drawing-in and drawing-out with respect to the photographing apparatus or camcorder.

Additional objects and advantages of the invention will be set forth in part in the description which follows and, in part, will be obvious from the description, or may be learned by practice of the invention.

The foregoing and other objects of the present invention are achieved by providing a viewfinder of a photographing apparatus comprising a viewfinder body disposed to be drawn into a photographing apparatus body and to be drawn out of the photographing apparatus body, and a driving unit to drive the drawing-in and drawing-out of the viewfinder body.

According to the present invention, when a user does not use the viewfinder, the viewfinder is drawn into the photographing apparatus body, thus allowing the appearance of the photographing apparatus to be very appealing to the eye. Further, the photographing apparatus of the present invention is easy to handle and store.

On the other hand, the photographing apparatus according to the present invention includes a photographing apparatus body, a display rotatably disposed at an outside portion of the photographing apparatus body to be operated when the rotating range of the photographing apparatus body is more than a predetermined range, a viewfinder body disposed to be drawn into the photographing apparatus body and drawn out of the photographing apparatus body, a driving unit to drive the drawing-in and drawing-out of the viewfinder body, a controlling unit to control the driving unit to draw the viewfinder body inside of the photographing apparatus body when the display is operated, and draw the viewfinder body outside of the photographing apparatus body when the display is not operated.

BRIEF DESCRIPTION OF THE DRAWINGS

These and other objects and advantages of the present invention will become apparent and more readily appreciated from the following description of the embodiments, taken in conjunction with the accompanying drawings of which:

FIG. 7 is a table illustrating the drawing-in and drawing-out of the viewfinder body in accordance with a driving status of the outer LCD of FIG. 6; and FIG. 8 is a table illustrating the indication of an image signal in accordance with an action of a first and a second switch in FIG. 6.

DETAILED DESCRIPTION OF THE PREFERRED EMBODIMENTS

Figure 1:
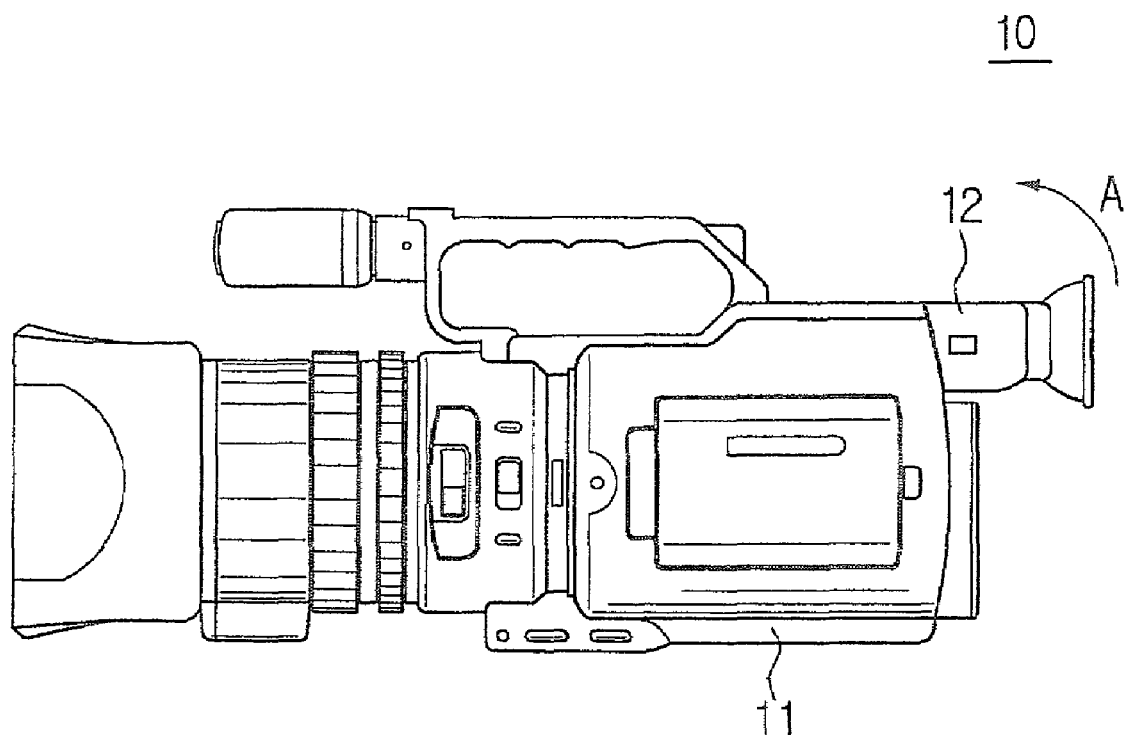
FIG. 1 is a perspective view schematically illustrating a viewfinder of a conventional camcorder.

Reference will now be made in detail to the embodiments of the present invention, examples of which are illustrated in the accompanying drawings, wherein like reference numerals refer to the like elements throughout. The embodiments are described below in order to explain the present invention by referring to the figures.

A camcorder 100 having a viewfinder 120 of a photographing apparatus according to the present invention will be described by referring to FIGS. 2A through 6.

Referring to FIGS. 2A through 6, the camcorder 100 includes a rotating range detecting unit 72, a rotating degree detecting unit 74, a photographing unit 82, a reproducing unit 84, a display driving unit 86, a camcorder body 110, the viewfinder 120, and an outer LCD unit 130. The camcorder body 110 is a casing that includes therein the photographing unit 82 to photograph an object, a recording unit (not shown) to record the photographed image to a magnetic recording medium, and the reproducing unit 84 to reproduce the recorded image.

Figure 2A:
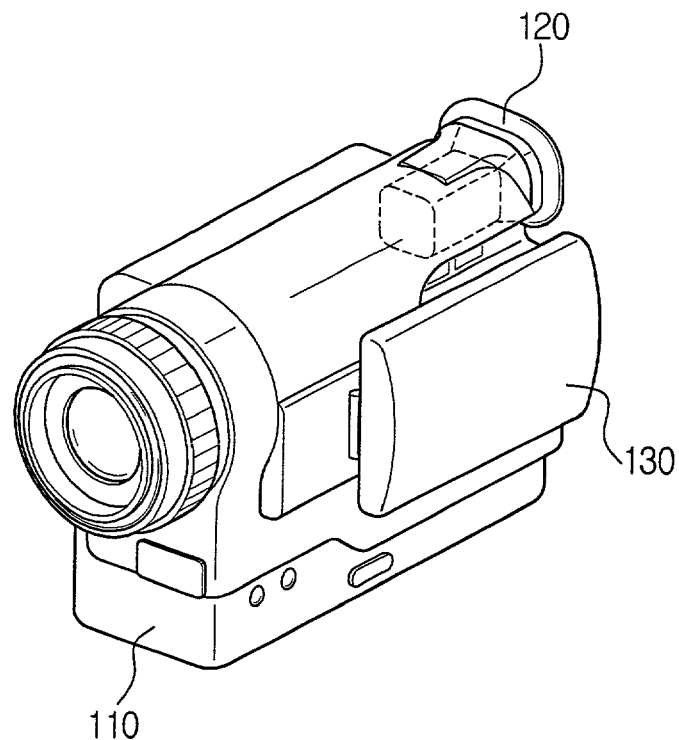
FIG. 2A is a perspective view illustrating a camcorder having a viewfinder according to the present invention.
Figure 2B:
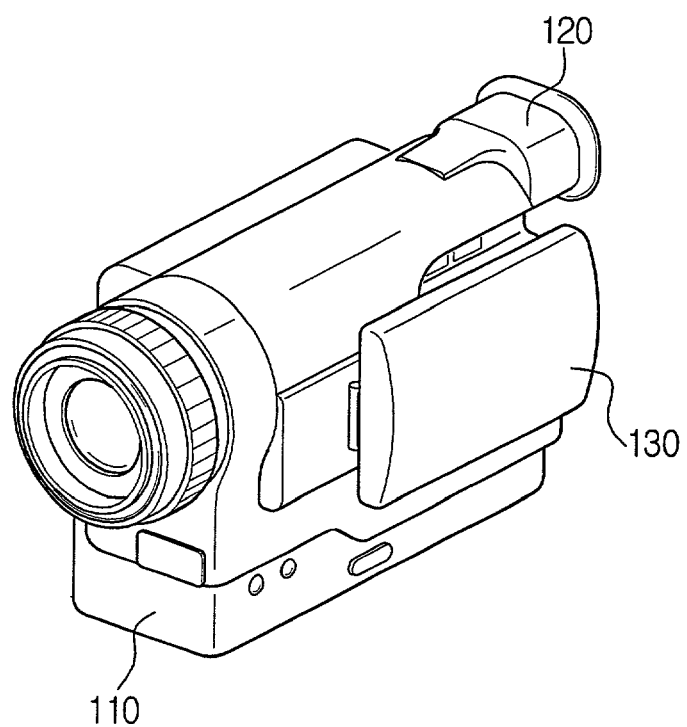
FIG. 2B is a perspective view illustrating the viewfinder of a photographing apparatus being drawn out from the camcorder of FIG. 2A.

The viewfinder 120, as shown in FIG. 2A, is drawn into the camcorder body 110 when it is not in operation. In addition, the viewfinder 120, as shown in FIG. 2B, is disposed to be drawn out of the camcorder body 110 when the user photographs the image using the viewfinder 120 only, or as shown in FIG. 2D, using both the viewfinder 120 and the outer LCD 130 together.

Figure 2C:
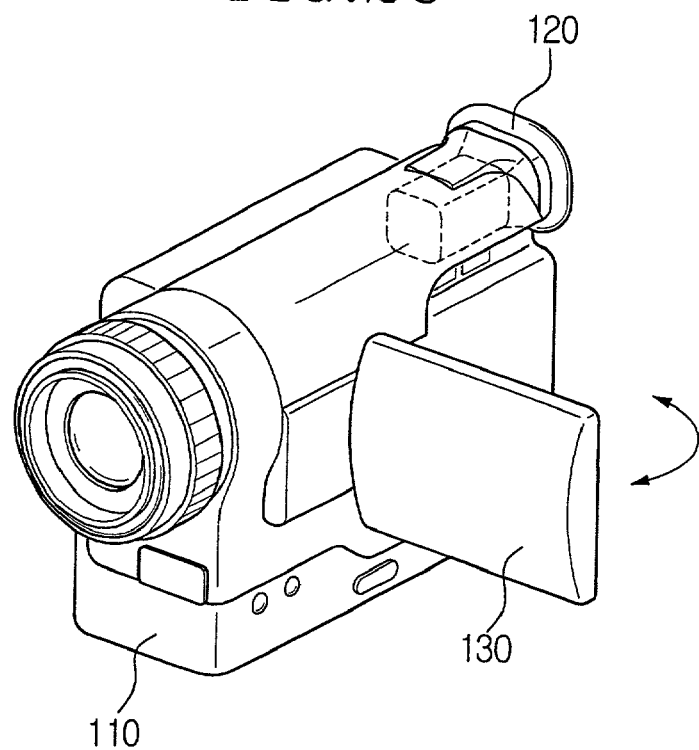
FIG. 2C is a perspective view illustrating an outer LCD being operated exclusively in the camcorder of FIG. 2A.
Figure 2D:
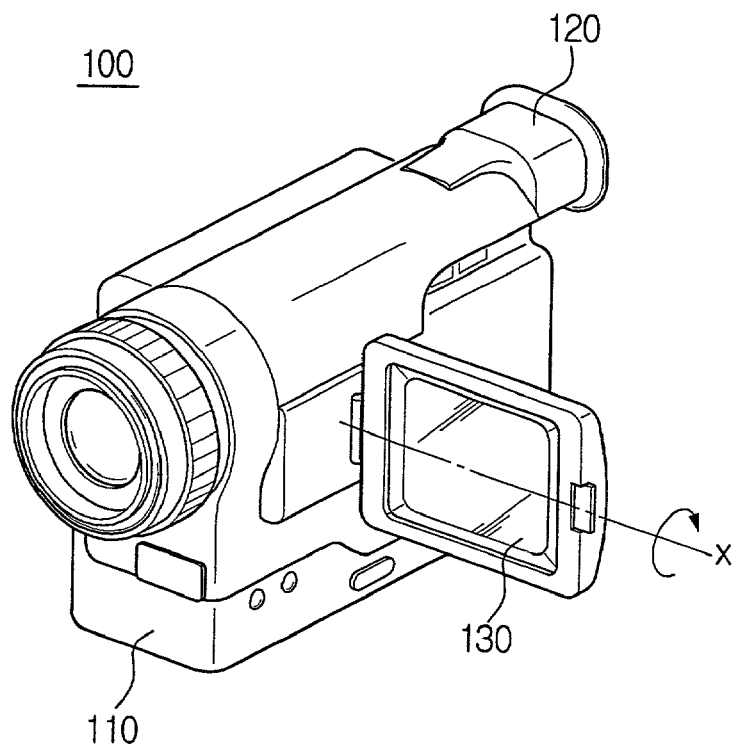
FIG. 2D is a perspective view illustrating both the viewfinder of a photographing apparatus and the outer LCD being used in the camcorder of FIG. 2A.

The outer LCD 130 displays the photographed image or the reproducing image, and is disposed to be rotated, opened, and closed with respect to an outer side of the camcorder body 110, as shown in FIG. 2C. Moreover, the outer LCD 130 is disposed to be operated when the rotating range of the outer LCD 130 with respect to the camcorder body 110 is greater than a predetermined degree, for example, more than 10° and less than 20°. The outer LCD 130, as shown in FIG. 2D, is disposed to turn on a rotational axis X on a plane thereof.

Figure 3:
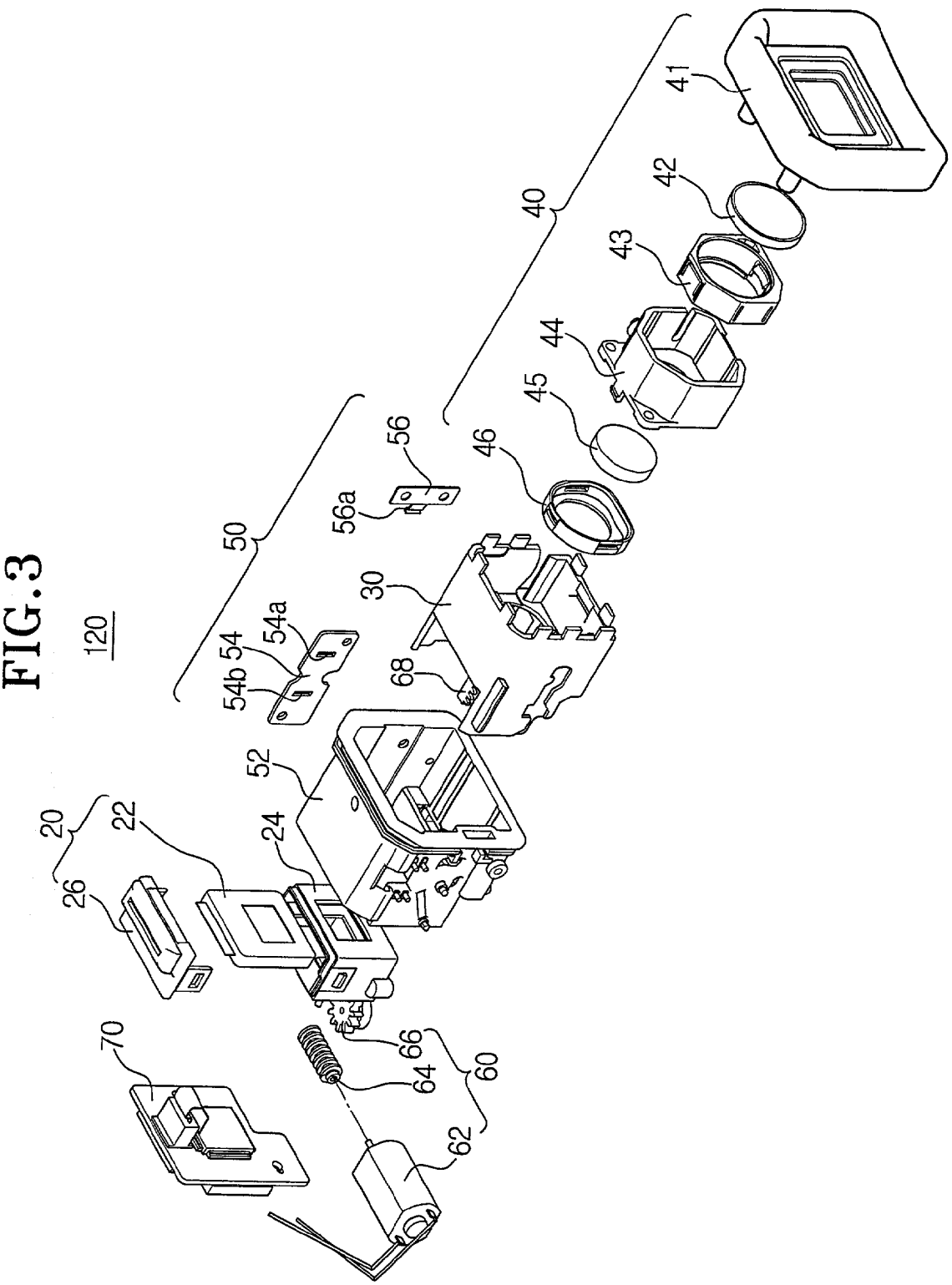
FIG. 3 is an exploded perspective view illustrating the structure of the viewfinder of FIG. 2A.

As shown in FIG. 3, the viewfinder 120 includes an inner LCD unit 20, a viewfinder body 30, a lens assembly 40, a guide 50, a driving unit 60, and a controlling unit 70.

The inner LCD unit 20 to display the reproducing image or the photographing image includes a viewfinder LCD 22, an inner LCD holder 24 and an inner LCD cap 26. The viewfinder LCD 22 to display the image of the object is inserted in the inner LCD holder 24 and secured at the inner LCD holder 24 by the inner LCD cap 26.

The lens assembly 40 includes an eye piece 41, a visibility adjusting lens 42, a first lens holder 43, an eye piece holder 44, a magnification lens 45, and a second lens holder 46. The visibility adjusting lens 42 is disposed at the first lens holder 43 to adjust a user's focal point to thereby allow the user to see an image formed at the viewfinder LCD 22 more clearly. The first lens holder 43 is disposed at the eye piece holder 44 and secured at the eye piece holder 44 by the eye piece 41. The magnification lens 45 is disposed on the second lens holder 46 to magnify the image formed at the viewfinder LCD 22 with a predetermined ratio so that the user can recognize the image.

The viewfinder body 30 is formed to have a cylindrical shape, and the lens assembly 40 is mounted thereon.

Figure 5:
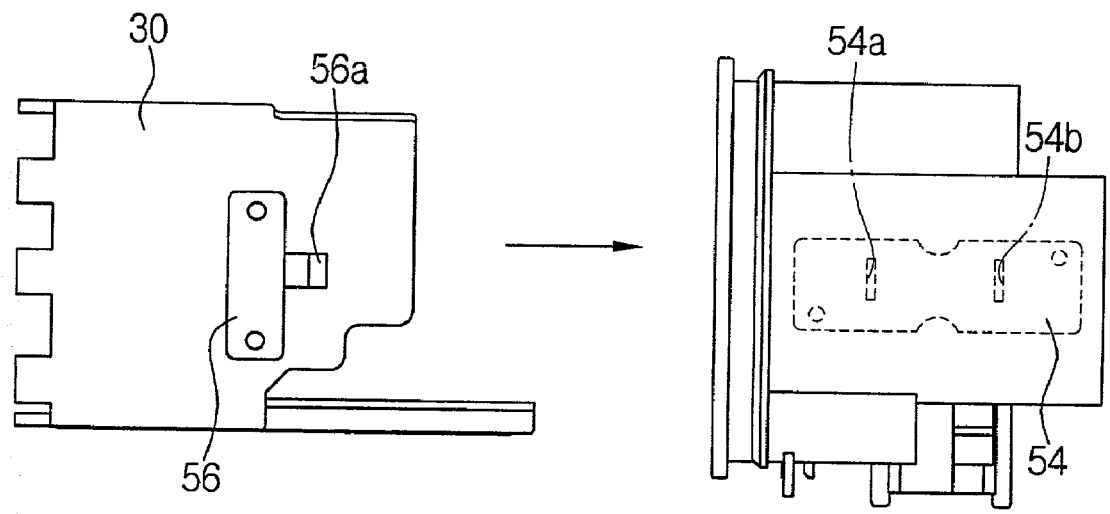
FIG. 5 is a side view illustrating the structure of a guide of FIG. 3.

The guide 50 includes a housing 52, a guide plate 54, and a plate spring 56. The housing 52 is formed at an outer part of the viewfinder body 30 and is formed to have a cylindrical shape to correspond to the viewfinder body 30. The housing 52 is disposed at the camcorder body 110 and connected with the viewfinder body 30 to guide the sliding movement of the viewfinder body. The guide plate 54, as shown in FIG. 5, is secured at an inner side of the housing 52, and a first guide hole 54a and a second guide hole 54b are formed in the guide plate 54. The first guide hole 54a and the second guide hole 54b are spaced from each other by a moving length of the viewfinder body 30. The plate spring 56 is disposed at an outer wall of the viewfinder body 30 to correspond to the installation location of the guide plate 54 and includes a guide protrusion 56a to contact and connect with the first and the second guide hole 54a and 54b.

When the viewfinder body 30 is drawn into the camcorder body 110, the guide protrusion 56a is slid from the first guide hole 54a to the second guide hole 54b to engage the second guide hole 54b and limits the drawing-in length of the viewfinder body 30. On the other hand, when the viewfinder body 30 is drawn out of the camcorder body 110, the guide protrusion 56a is slid from the second guide hole 54b to the first guide hole 54a to engage the first guide hole 54a and limits the drawing-out length of the viewfinder body 30.

Figure 4:
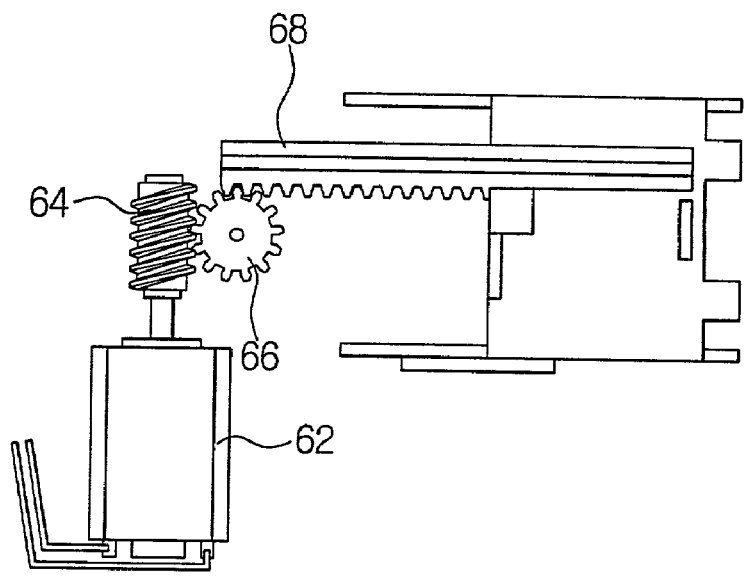
FIG. 4 is a bottom view illustrating the structure of a driving unit of FIG. 3.

The driving unit 60 is disposed in the camcorder body 110 to drive the drawing-in and drawing-out operations of the viewfinder body 30. As shown in FIG. 4, the driving unit 60 includes a driving motor 62, a worm gear 64, a pinion 66, and a rack 68. The driving motor 62 is secured at the camcorder body 110. The worm gear 64 is connected with the driving motor 62 and transmits a rotating force of the driving motor 62 to the pinion 66. The rack 68 is disposed at a predetermined place of the viewfinder body 30 to engage with the pinion 66.

The worm gear 64 is rotated along a driving shaft of the driving motor 62 in accordance with the driving of the driving motor 62. The pinion 66 is rotated in accordance with the rotating of the worm gear 64. The rack 68 moves linearly in a moving direction of the viewfinder body 30 in accordance with rotation of the pinion 66. The viewfinder body 30 is drawn into and drawn out of the camcorder body 110 along the guide 50 in accordance with the linear movement of the rack 68. The worm gear 64 reduces the rotating speed of the driving motor 62 and increases the rotating force of the pinion 66. Therefore, the viewfinder 120 is smoothly drawn into and drawn out of the camcorder body 110.

Figure 6:
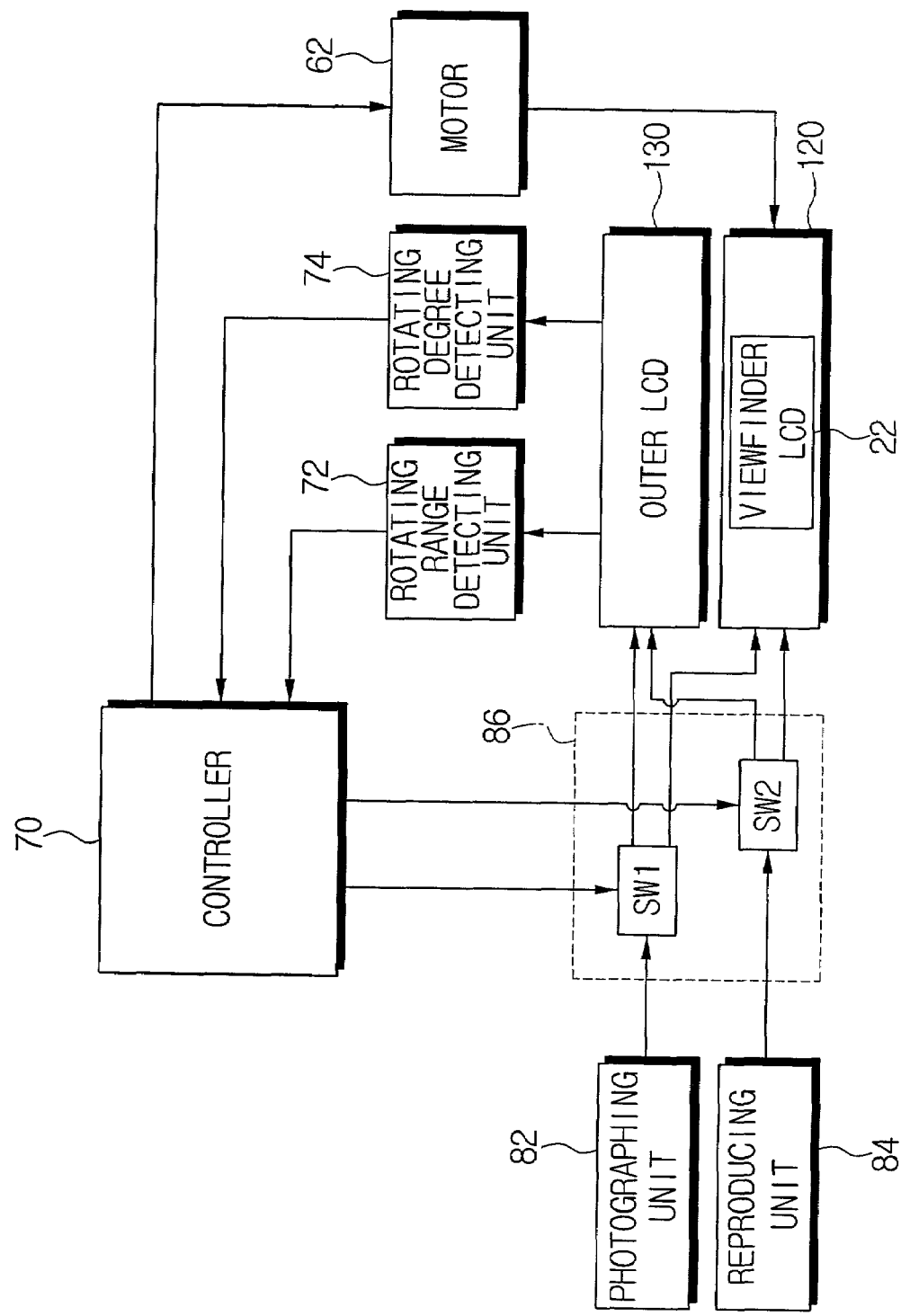
FIG. 6 is a block diagram illustrating the inner structure of the camcorder of FIG. 2A.

Referring to FIG. 6, a controlling unit 70 is disposed at the camcorder body 110 and drives the driving motor 62 in accordance with a user's manipulation. In other words, when power is supplied to photograph and/or reproduce an image, the controlling unit 70 controls the driving unit 60 so that the viewfinder 120 can be drawn out of the camcorder body 110. On the other hand, when power of the camcorder 100 is off, the controlling unit 70 controls the driving unit 60 so that the viewfinder 120 can be drawn into the camcorder body 110. In addition, the controlling unit 70 controls the driving unit 60 so that the viewfinder body 30 can be drawn into and drawn out of the camcorder body 110 in accordance with a detecting signal of the rotating range detecting unit 72 and/or the rotating degree detecting unit 74. In other words, when the rotating range detecting unit 72 detects that the outer LCD 130 is rotated more than a predetermined degree with respect to the camcorder body 110, the controlling unit 70 controls the driving unit 60 so that the viewfinder body 30 is drawn into the camcorder body 110. On the other hand, when the rotating range detecting unit 72 detects that the outer LCD 130 is closed, or when a rotating degree detecting unit 74 detects that the outer LCD is rotated 180° on a rotating axis X on the plane of the outer LCD 130, the controlling unit 70 controls the driving unit 60 so that the viewfinder body 30 is drawn out of the camcorder body 110.

The display driving unit 86 drives the outer LCD 130 and/or the viewfinder LCD 22 to display a photographing image at the photographing unit 82 or a reproduced image at the reproducing unit 84 under the control of the controlling unit 70 at the outer LCD 130 and/or the viewfinder LCD 22. The display driving unit 86 comprises a first switch SW1 and a second switch SW2. The first switch SW1 is connected with the photographing unit 82, the outer LCD 130 and/or the viewfinder LCD 22 under the control of the controlling unit 70. The second switch SW2 is connected with the reproducing unit 84 and the outer LCD 130 and/or the viewfinder LCD 22 under the control of the controlling unit 70.

General operation of the camcorder with the above construction will be described by referring to FIGS. 3 through 8.

When the user wants to photograph an object while seeing an image of the object through the viewfinder 120 of the camcorder 100 shown in FIG. 2A, the controlling unit 70 drives the driving motor 62 in accordance with a controlling signal from the user. When the driving motor 62 is driven, the rack 68, engaged with the pinion 66, is moved in the drawing-out direction of the viewfinder 120 in accordance with the rotating of the worm gear 64. Since the rack 68 is moved, the viewfinder body 30 is drawn out of the housing 52 until the guide protrusion 56a of the plate spring 56 is separated from the second guide hole 54b and connected with the first guide hole 54a. As shown in FIG. 2B, if the viewfinder 120 is drawn out of the camcorder body 110, the controlling unit 70 supplies the image, photographed at the photographing unit 82, to the viewfinder LCD 22 by turning on the second switch SW2. At this time, the outer LCD 130 is closed, and the first switch SW1 is turned off.

When the user wants to photograph the image while seeing the outer LCD 130 of the camcorder 100 instead of the viewfinder 120, the user rotatably opens the outer LCD 130. The rotating range detecting unit 72 detects the rotating degree of the outer LCD 130 and sends this information to the controlling unit 70. The controlling unit 70 draws in the viewfinder 120 into the camcorder body 110 by driving the driving motor 62 when the rotating degree, detected at the rotating range detecting unit 72, falls in a predetermined range that is more than 10° and less than 20°. Further, the controlling unit 70 does not supply the image, photographed at the photographing unit 82, to the viewfinder LCD 22 by turning off the second switch SW2. Moreover, the controlling unit 70 displays the image signal photographed at the photographing unit 82 through the outer LCD 130 by turning on the first switch SW1.

Similar to the above operation, if the user closes the outer LCD 130 of the camcorder 100 while photographing the image using the viewfinder 120, the rotating range detecting unit 72 detects the rotating degree of the outer LCD 130 and sends this information to the controlling unit 70. When the rotating degree detected at the rotating range detecting unit 72 is less than 100, the controlling unit 70 turns off the first switch SW1 and does not display the image photographed at the photographing unit 82 through the outer LCD 130. Instead, the controlling unit 70 draws the viewfinder 120 outside of the camcorder body 110 by driving the driving motor 62. When the driving motor 62 is driven in this case, the rack 68, engaged with the pinion 66, is moved in the drawing-out direction of the viewfinder 120 in accordance with the rotation of the worm gear 64. As the rack 68 moves, the viewfinder body 30 is drawn out from the housing 52 until the guide protrusion 56a of the plate spring 56 is separated from the second guide hole 54b and connected with the first guide hole 54a. As shown in FIG. 2B, when the viewfinder 120 is drawn out from the camcorder body 110, the controlling unit 70 drives the second switch SW2. As the second switch SW2 is driven, the image signal, photographed through the photographing unit 82, is displayed on the viewfinder LCD 22.

Another example provides a case wherein the image being photographed is a person, wherein both the user that photographs the image using the camcorder 100 and the person that is being photographed want to see the photographing image. The person who photographs the image manipulates a drawing-out signal of the viewfinder 120 to the controlling unit 70. The controlling unit 70 drives the driving motor 62 in accordance with the drawing-out signal. When the driving motor 62 is driven, the rack 68, engaged with the pinion 66, is moved in the drawing-out direction of the viewfinder 120 in accordance with rotation of the worm gear 64. As the rack 68 moves, the viewfinder body 30 is drawn out of the housing 52 until the guide protrusion 56a of the plate spring 56 is separated from the second guide hole 54b and connected with the first guide hole 54a. As shown in FIG. 2B, if the viewfinder 120 is drawn out of the camcorder body 110, the controlling unit 70 supplies the image signal photographed through the photographing unit 82 to the viewfinder LCD 22 by turning on the second switch SW2. Then, the person doing the photographing opens the outer LCD 130 and makes the outer LCD 130 face the image being photographed by rotating the outer LCD 130 on a rotating axis X on the plane of the outer LCD 130. The rotating range detecting unit 72 detects the rotating degree of the outer LCD 130 and sends this information to the controlling unit 70. The controlling unit 70 turns on the first switch SW1 when the rotating degree detected at the rotating range detecting unit 72 is more than 170° and less than 270°, and controls the outer LCD 130 to display the image photographed at the photographing unit 82 thereon. The user who photographs the image can see the photographed image through the viewfinder 120, and the person being photographed can see the photographed image through the outer LCD 130.

In an embodiment of the present invention, the image being photographed through the photographing unit 82 has been illustrated and described, but the present invention is not limited to the embodiment. The present invention can be applied to a case wherein the image being recorded at a predetermined recording medium is reproduced through the reproducing unit 84. In table 7, the drawing-in and drawing-out of the viewfinder 120, as described above, in accordance with the outer LCD 130 is shown. In FIG. 8, it is illustrated whether the image signal is displayed or not at the outer LCD 130 and/or the viewfinder 120, in accordance with the on/off status of the first switch SW1 and the second switch SW2.

According to the present invention, when the camcorder 100 is turned on or when the outer LCD 130 is closed, the viewfinder body 30 is automatically drawn out of the camcorder body 110. In the meantime, when the camcorder 100 is turned off or the outer LCD 130 attached at the camcorder 100 is opened, the viewfinder body 30 is drawn into the camcorder 100. Therefore, the operation of the viewfinder 120 is simple.

Moreover, when the outer LCD 130 is rotated by, for example, 180° on the rotating axis on the plane of the outer LCD 130, the viewfinder body 30 is drawn out of the camcorder body 110 with the above construction, and both the person who photographs and the image (or person) being photographed can view the photographed image. Note that the degree of rotation of the outer LCD 130 on the rotating axis on the plane of the outer LCD 130 may be set to any desired degree that provides the inventive feature as stated above.

In addition, since the viewfinder 120 can be drawn into the camcorder body 110, handling and storing of the camcorder 100 becomes easier, and the appearance of the camcorder can be designed easier and more appealing to the eye.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A viewfinder for use in a photographing apparatus having a body, comprising:
   a viewfinder body disposed to be drawn into the photographing apparatus body and to be drawn out of the photographing apparatus body, said viewfinder body comprising a viewfinder to view an image to be recorded and/or reproduced; and
   a driving unit to drive the drawing-in and drawing-out of said viewfinder body;
   a plate spring having a guide protrusion and connected to a side of said viewfinder body; and
   a guide plate having a first guide hole and a second guide hole and connected to a side of said guide facing said plate spring;
   wherein said plate spring engages with said first guide hole when said viewfinder body is drawn out of the photographing apparatus and engages with said second guide hole when said viewfinder body is drawn into the photographing apparatus to limit the drawing-in and drawing-out length of said viewfinder body.

2. The viewfinder of a photographing apparatus according to claim 1, further comprising a guide disposed at the photographing apparatus body to guide the drawing-in and drawing-out of said viewfinder body.

3. The viewfinder of a photographing apparatus according to claim 2, wherein said viewfinder body has a cylindrical shape, and said guide has a cylindrical shape and is connected with an outside of said viewfinder body to allow the view finder body to slide using said guide.

4. A photographing apparatus, comprising:
   a photographing apparatus body;
   a display rotatably disposed at an outer side of the photographing apparatus body;
   a rotating range detecting unit to detect a degree of rotation of said display with respect to the photographing apparatus body;
   wherein said display operates when the rotating range of the photographing apparatus body is beyond a predetermined range;
   a viewfinder body disposed to be drawn into the photographing apparatus body and drawn out of the photographing apparatus body, said viewfinder body comprising a viewfinder to view an image to be recorded and/or reproduced;
   a driving unit to drive the drawing-in and drawing-out of said viewfinder body; and
   a controlling unit to control the driving unit to draw said viewfinder body inside of the photographing apparatus body when the display is operated, and to draw the viewfinder body outside of the photographing apparatus body when the display is not operated.

5. The photographing apparatus according to claim 4, wherein said driving unit comprises:
   a driving motor secured in the photographing apparatus body;
   a pinion rotated by said driving motor; and
   a rack disposed at said viewfinder body and driven by said pinion.

6. The photographing apparatus according to claim 5, further comprising:
   a worm gear to transmit a rotating force of said driving motor to said pinion.

7. The photographing apparatus according to claim 5, wherein said controlling unit controls said driving unit to draw said viewfinder body outside of the photographing apparatus body while reproducing or recording is being performed.

8. The photographing apparatus according to claim 5, wherein said display is disposed to be rotated on a predetermined rotating axis on a plane of said display, and said controlling unit controls said driving unit to draw said viewfinder body outside of the photographing apparatus body when said display rotates on the rotating axis beyond a predetermined degree.

9. The photographing apparatus according to claim 5, further comprising a guide disposed at the photographing apparatus body to guide the drawing-in and drawing-out of said viewfinder body.

10. The photographing apparatus according to claim 9, wherein said viewfinder has a cylindrical shape, and said guide has a cylindrical shape and is connected with an outer side of said viewfinder body to slide said viewfinder body using said guide.

11. The photographing apparatus according to claim 8, further comprising:
    a rotating degree detecting unit to detect the degree of rotation of said display with respect to a rotating axis on a plane of said display.

12. The photographing apparatus according to claim 8, further comprising:
    a display driving unit to drive said display and/or said viewfinder to display said image.

13. The photographing apparatus according to claim 12, wherein said display driving unit further comprises:
    a first switch to provide said image to said display; and
    a second switch to provide said image to said viewfinder.

14. The photographing apparatus according to claim 13, wherein said controlling unit turns on said first switch when said viewfinder body is drawn out of the photographing apparatus body.

15. The photographing apparatus according to claim 14, wherein said controlling unit turns on said second switch when said display is rotated a predetermined degree with respect to the photographing apparatus body and draws said viewfinder body into the photographing apparatus body.

16. The photographing apparatus according to claim 14, wherein said controlling unit draws said viewfinder body outside of said photographing body to provide said viewed image to both said viewfinder and said display and turns on said first switch and said second switch when said display is rotated a predetermined degree with respect to a rotating axis along a plane of said display and perpendicular to said outer side of said photographing apparatus on which said display is disposed.

17. The photographing apparatus according to claim 13, wherein said controlling unit turns on said second switch when said display is rotated a predetermined degree with respect to the photographing apparatus body and draws said viewfinder body into the photographing apparatus body.

18. The photographing apparatus according to claim 17, wherein said controlling unit draws said viewfinder body outside of said photographing body to provide said viewed image to both said viewfinder and said display and turns on said first switch and said second switch when said display is rotated a predetermined degree with respect to a rotating axis along a plane of said display and perpendicular to said outer side of said photographing apparatus on which said display is disposed.

19. The photographing apparatus according to claim 13, wherein said controlling unit draws said viewfinder body outside of said photographing body to provide said viewed image to both said viewfinder and said display and turns on said first switch and said second switch when said display is rotated a predetermined degree with respect to a rotating axis along a plane of said display and perpendicular to said outer side of said photographing apparatus on which said display is disposed.

20. The photographing apparatus according to claim 19, wherein said predetermined degree of rotation of said display with respect to the rotation axis on a plane of said display is 180 degrees.

21. The photographing apparatus according to claim 13, wherein said controlling unit draws said viewfinder body into said photographing body and turns on said first switch when said display is rotated between 10-20 degrees with respect to a rotating axis along a plane of said display and perpendicular to said outer side of said photographing apparatus on which said display is disposed.

22. The photographing apparatus according to claim 13, wherein said controlling unit draws said viewfinder body into said photographing body and turns on said second switch when said display is rotated between 170-270 degrees with respect to a rotating axis along a plane of said display and perpendicular to said outer side of said photographing apparatus on which said display is disposed.

23. A photographing apparatus, comprising:
a photographing apparatus body;
a display rotatably disposed at an outer side of the photographing apparatus body about a first axis substantially parallel to the outer side;
a rotating range detecting unit to detect a degree of rotation of said display with respect to the photographing apparatus body;
wherein said display operates when the rotating range of the photographing apparatus body about the first axis is beyond a predetermined range;
a viewfinder body which is extendable and retractable based upon a power status of the photographing apparatus, said viewfinder body comprising a viewfinder to view an image to be recorded and/or reproduced;
a driving unit to drive the drawing-in and drawing-out of said viewfinder body; and
a controlling unit to control the driving unit to draw said viewfinder body inside of the photographing apparatus body when the display is operated, and to draw the viewfinder body outside of the photographing apparatus body when the display is not operated.

24. The photographing apparatus according to claim 23, wherein the viewfinder body is extendable and retractable based upon the rotating range of the photographing apparatus body relative to the predetermined range.

25. The photographing apparatus according to claim 24, wherein:
the display is rotatably disposed about a second axis perpendicular to the first axis and in a plane of the display; and
the viewfinder body is extendable and retractable based upon a rotation position of the display about the second axis.

* * * * *

UNITED STATES PATENT AND TRADEMARK OFFICE
CERTIFICATE OF CORRECTION

PATENT NO.        : 7,298,410 B2                                           Page 1 of 1
APPLICATION NO.   : 10/125496
DATED             : November 20, 2007
INVENTOR(S)       : Jeong-goo Kim It is certified that error appears in the above-identified patent and that said Letters Patent is hereby corrected as shown below:

Column 7, Line 54, change "view finder" to --viewfinder--.

Signed and Sealed this

Sixth Day of May, 2008

JON W. DUDAS
*Director of the United States Patent and Trademark Office*